(12) United States Patent
Jopson

(10) Patent No.: US 11,212,005 B1
(45) Date of Patent: Dec. 28, 2021

(54) BIDIRECTIONAL OPTICAL COMMUNICATION SYSTEM EMPLOYING HOLLOW-CORE FIBER

(71) Applicant: Nokia Solutions and Networks OY, Espoo (FI)

(72) Inventor: Robert Meachem Jopson, Rumson, NJ (US)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 17/082,256

(22) Filed: Oct. 28, 2020

(51) Int. Cl.
| H04B 10/00 | (2013.01) |
| H04B 10/25 | (2013.01) |
| H04B 10/2581 | (2013.01) |
| H04B 10/2507 | (2013.01) |
| H04J 14/00 | (2006.01) |

(52) U.S. Cl.
CPC ..... *H04B 10/2589* (2020.05); *H04B 10/2507* (2013.01); *H04B 10/2581* (2013.01)

(58) Field of Classification Search
CPC ..... H04B 10/40; H04B 10/43; H04B 10/2581
See application file for complete search history.

(56) References Cited

U.S. PATENT DOCUMENTS

| 6,834,071 B2 | 12/2004 | Sugiyama |
| 7,664,352 B1 | 2/2010 | Okayama |
| 7,697,143 B2 | 4/2010 | Sanders et al. |
| 8,150,224 B2 | 4/2012 | Okayama |
| 8,488,923 B2 | 7/2013 | Na et al. |
| 8,488,924 B2 | 7/2013 | Lee et al. |
| 9,874,699 B2 | 1/2018 | Miao et al. |
| 9,964,704 B2 | 5/2018 | Hatori et al. |
| 10,230,468 B2 | 3/2019 | Rad et al. |
| 10,649,148 B2 | 5/2020 | Sodagar et al. |
| 10,663,663 B2 | 5/2020 | Painchaud et al. |

(Continued)

OTHER PUBLICATIONS

Chiniforooshan, Yasser, et al. "High Capacity Coherent Systems Using Same-Wavelength Bidirectional Transmission." Asia Communications and Photonics Conference. Optical Society of America (2019): 1-3.

(Continued)

*Primary Examiner* — Daniel G Dobson
(74) *Attorney, Agent, or Firm* — Mendelsohn Dunleavy, P.C.; Yuri Gruzdkov (57) ABSTRACT

A bidirectional optical communication system employing one or more spans of hollow-core optical fiber. In at least some embodiments, the hollow-core optical fiber can be used to simultaneously transmit, in opposite directions, optical data signals having substantially the same carrier wavelength. In such embodiments, the spectral efficiency of the bidirectional optical communication system can advantageously be about two times higher than the spectral efficiency of a comparable conventional optical communication system employing only solid-core optical fibers. In some embodiments, the bidirectional optical communication system may have a solid-core optical fiber end-connected between two spans of hollow-core optical fiber. In some embodiments, the bidirectional optical communication system may use a hollow-core optical fiber for transmission of different WDM optical data signals in opposite directions.

16 Claims, 4 Drawing Sheets

(56) References Cited

U.S. PATENT DOCUMENTS

| | | | |
|---|---|---|---|
| 2010/0054663 A1 | 3/2010 | Okayama | |
| 2011/0182549 A1 | 7/2011 | Okayama | |
| 2012/0219301 A1* | 8/2012 | Koch, III | H04B 10/2581 |
| | | | 398/142 |
| 2012/0307251 A1 | 12/2012 | Sanders et al. | |
| 2013/0291642 A1* | 11/2013 | Crickmore | G01H 9/00 |
| | | | 73/655 |
| 2019/0173604 A1* | 6/2019 | Xie | H04J 14/04 |
| 2019/0199446 A1* | 6/2019 | Sundaram | G02B 6/4246 |
| 2020/0025999 A1* | 1/2020 | DiGiovanni | G02B 6/02328 |

OTHER PUBLICATIONS

Jasion, Gregory T., et al. "Hollow Core NANF with 0.28 dB/km Attenuation in the C and L Bands." Optical Fiber Communication Conference. Optical Society of America paper ThB.4 (2020): 1-3.

Ko, Jeongyun, et al. "Estimation of Performance Degradation of Bidirectional WDM Transmission Systems Due to Rayleigh Backscattering and ASE Noises Using Numerical and Analytical Models." Journal of Lightwave Technology 21.4 (2003): 938-946.

Liaw, Shien-Kuei, et al. "Power penalty induced by Rayleigh backscattering in a bidirectional wavelength-reuse lightwave system." Technical Digest. Summaries of papers presented at the Conference on Lasers and Electro-Optics. Postconference Technical Digest OSA. paper CThL54 (2001): 1-2.

Luo, Ming, et al. "100 GB/s (4× 25 GB/s) real-time coherent UDWDM-PON with a large power budget." Journal of Dptical Communications and Networking 12.2 (2020): A204-A213.

Marki, C. F., et al. "Modeling of Coherent and Incoherent Rayleigh Crosstalk in Conventional Optical Links." IEEE Photonics Technology Letters 19.21 (2007): 1735-1737.

Nawazuddin, Mubassira Banu Syed, et al. "Lotus-Shaped Negative Curvature Hollow Core Fiber With 10.5 dB/km at 1550 nm Wavelength." Journal of Lightwave Technology 36.5 (2017): 1213-1219.

Radic, S. et al. "Feasibility of Hybrid Raman/EDFA Amplification in Bidirectional Optical Transmission " IEEE Photonics and Technology Letters 14.2 (2002): 221-223.

Radic, S., et al. "Limitations in Dense Bidirectional Transmission in Absence of Optical Amplification" IEEE Photonics Technology Letters 14.1 (2002): 95-97.

Shoji, T., et al. "Low loss mode size converter from 0.3 pm square Si wire waveguides to singlemode fibres." Electronics Letters 38.25 (2002): 1669-1670.

Staubli, Roland Karl et al. "Rayleigh noise in bidirectional optical communication systems." Optical Fiber Communication Conference. Technical Digest, Optical Society of America, paper THC4 (1990): 1-1.

Sumida, Masatoyo, et al. "Limitations imposed by Rayleigh backscattering in closely interleaved, bidirectional WDM transmission systems." IEEE Photonics Technology Letters 15.1 (2003): 150-152.

Yu, Fei, et al. "Negative Curvature Hollow-Core Optical Fiber" IEEE Journal of Selected Topics in Quantum Electronics 22.2 (2016): 146-155.

Wood, Thomas H., et al. "Observation Of Coherent Rayleigh Noise In Single-source Bidirectional Optical Fiber Systems." Journal of Lightwave Technology 6.2 (1988): 346-352.

"II-VI Incorporated Announces Bi-Directional Optical Line Subsystem Platform for Datacenter Interconnects", www.globenewswire.com, 2018 [retrieved on Aug. 28, 2020] Retrieved from the Internet: <URL: http://www.globenewswire.com/news-release/2018/03/08/1418852/0/en/II-VI-lncorporated-Announces-Bi-Directional-Optical-Line-Subsystem-Platform-for-Datacenter-lnterconnects.html> (3 pages).

Ravaille, Alexia, et al. "In-situ measurement of backscattering in hollow-core fiber based resonant cavities." IEEE Photonics Journal 9 4 (2017): 1-7.

ITU-T, Recommendation G.694.1: "Spectral grids for WDM applications: DWDM frequency grid" (2012): 1-16.

Iwai, Katsumasa, et al. "Fabrication of Shatter-Proof Metal Hollow-Core Optical Fibers for Endoscopic Mid-Infrared Laser Applications." Fibers 6.2 (2018): 24.

Bufetov, Igor A., et al. "Revolver Hollow Core Optical Fibers." Fibers 6.2 (2018): 39.

Provino, Laurent. "Effect of Nested Elements on Avoided Crossing between the Higher-Order Core Modes and the Air-Capillary Modes in Hollow-Core Antiresonant Optical Fibers." Fibers 6.2 (2018): 42.

Cruz, Alice L.S., et al. "3D Printed Hollow-Core Terahertz Fibers." Fibers 6.3 (2018): 43.

Zeisberger, Matthias, et al. "Understanding Dispersion of Revolver-Type Anti-Resonant Hollow Core Fibers." Fibers 6.4 (2018): 68.

Wei, Chengli, et al. "Geometry of Chalcogenide Negative Curvature Fibers for CO2 Laser Transmission." Fibers 6.4 (2018): 74.

Stawska, Hanna Izabela, et al. "Combining Hollow Core Photonic Crystal Fibers with Multimode, Solid Core Fiber Couplers through Arc Fusion Splicing for the Miniaturization of Nonlinear Spectroscopy Sensing Devices." Fibers 6.4 (2018): 77.

Eilzer, Sebastian, et al. "Hollow Core Optical Fibers for Industrial Ultra Short Pulse Laser Beam Delivery Applications." Fibers 6.4 (2018): 80.

Huang, Xiaosheng, et al. "A Method to Process Hollow-Core Anti-Resonant Fibers into Fiber Filters." Fibers 6.4 (2018): 89.

Debord, Benoit, et al. "Hollow-Core Fiber Technology: The Rising of "Gas Photonics"." Fibers 7.2 (2019): 16.

Belardi, Walter. "Hollow-Core Optical Fibers." Fibers 7.5 (2019): 50.

Nawazuddin, Mubassira Banu Syed, et al. "Lotus-Shaped Negative Curvature Hollow Core Fiber With 10.5 dB/km at 1550 nm Wavelength." Journal of Lightwave Technology 36.5 (Mar. 1, 2018): 1213-1219.

Shere, William, et al. "Low Loss, Large Bandwidth Antiresonant Hollow-Core Fiber Design for Short-Reach Links." Optical Fiber Communication Conference (OFC) 2020, San Diego, CA, USA, paper W4D.3 (Mar. 8, 2020): 1-3.

Hong, Yang, et al. "Comparative Investigations between SSMF and Hollow-core NANF for Transmission in the S+C+L-bands." Optical Fiber Communications Conference (OFC) 2020, San Diego, CA, USA, paper W3E.3 (Mar. 8, 2020): 1-3.

* cited by examiner

BIDIRECTIONAL OPTICAL COMMUNICATION SYSTEM EMPLOYING HOLLOW-CORE FIBER

BACKGROUND

Field

Various example embodiments relate to optical fiber communication equipment and, more specifically but not exclusively, to bidirectional transmission of optical data signals.

Description of the Related Art

This section introduces aspects that may help facilitate a better understanding of the disclosure. Accordingly, the statements of this section are to be read in this light and are not to be understood as admissions about what is in the prior art or what is not in the prior art.

A full-duplex (FDX) communication system supports concurrent transmissions on the upstream and downstream channels. To achieve FDX operation, some fiber-optic systems transmit optical data signals in one direction on one optical fiber and in the opposite direction on another optical fiber. An FDX communication system can be implemented using optical transceivers, with an optical transceiver being an electro-optical subsystem that includes a respective optical transmitter and a respective optical receiver, typically integrated in a manner that supports the intended function.

SUMMARY OF SOME SPECIFIC EMBODIMENTS

Disclosed herein are various embodiments of a bidirectional optical communication system employing one or more spans of hollow-core optical fiber. In at least some embodiments, the hollow-core optical fiber can be used to simultaneously transmit, in opposite directions, optical data signals having substantially the same carrier wavelength. In such embodiments, the spectral efficiency of the bidirectional optical communication system can advantageously be about two times higher than the spectral efficiency of a comparable conventional optical communication system employing only solid-core optical fibers.

In some embodiments, the bidirectional optical communication system may have a solid-core optical fiber end-connected between two spans of hollow-core optical fiber.

In some embodiments, the bidirectional optical communication system may use a hollow-core optical fiber for transmission of different wavelength-division-multiplexed optical data signals in opposite directions.

According to an example embodiment, provided is an apparatus comprising: an optical coupler to end-connect an optical fiber having one or more hollow-core optical fiber segments; an optical data transmitter optically connected to the optical coupler to transmit a first optical data signal through the optical fiber; and an optical data receiver optically connected to the optical coupler to receive a second optical data signal through the optical fiber, the first and second optical data signals being in overlapping wavelength channels to propagate in opposite directions along the optical fiber.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Typical optical fibers are circular dielectric waveguides that can transport optical energy and information. Conventional optical fibers have a solid central core surrounded by a solid cladding with a slightly lower (e.g., by about 1%) refractive index. The core and cladding are typically made of silica with index-modifying dopants, such as $GeO_2$. Since the core has a higher refractive index than the cladding, light can be guided by the core if curvature limitations imposed by the fiber geometry and refractive-index profile are met. The fiber geometry and composition determine the discrete set of fiber modes that can propagate along the fiber. A protective coating of one or more layers of a cushioning material (e.g., a polymer) can be used to reduce crosstalk between adjacent optical fibers and also to reduce the loss-increasing microbending, e.g., occurring when a fiber is pressed against a rough surface. For most applications, optical fibers can be incorporated into cables. Such cables typically have a plastic sheath that encases the optical fiber(s) within a strength member, e.g., made of steel or Kevlar strands.

A portion of the transmitted optical signal can be backscattered in a solid-core optical fiber, e.g., due to Rayleigh scattering in the fiber core. As known to persons of ordinary skill in the pertinent art, Rayleigh scattering in optical fiber is predominantly elastic in nature and is typically caused by scattering of light by material inhomogeneities, e.g., much smaller than the wavelength of the light. The power of the backscattered light in a long solid-core optical fiber can typically be ca. 30 to 35 dB lower than the optical power of the corresponding forward-traveling light, e.g., when measured at the transmitter end of the optical fiber. For comparison, a 100-km span of such fiber typically has a transmission loss between ca. 20 and 30 dB. Using these numbers, one can estimate that, in a bidirectional fiber span with optical transmitters at each end thereof emitting equal powers at the same carrier wavelength, the backscattered light from one direction can arrive at the optical receiver for the other direction with an optical power that is only approximately 15 to 0 dB lower than the optical power of the optical data signal that is intended for reception thereat. The resulting signal impairment typically makes bidirectional transmission in the same wavelength channel impractical for most applications. In fiber links that are not bidirectional at the same wavelength, this problem is solved by using different fibers in opposite directions, often with optical isolators or when a single fiber is used, by using different wavelengths in opposite directions with optical filtering to suppress backscattering. These solutions cannot be used in long bidirectional, single-fiber systems using the same carrier wavelengths in each direction.

In amplified optical links, the gains of optical amplifiers are typically set such that, for each span of optical fiber, the effective optical gain G is approximately unity (i.e., G≈1). This setting results in the optical-signal power received at the optical receiver to be substantially independent of the number M of the fiber spans, where M≥1. However, the power of backscattered light is substantially additive and can be approximately M times larger for M fiber spans than for a single fiber span if optical isolators are not used. As a result, bidirectional transmission in the same wavelength channel can be even more problematic for amplified optical links employing multiple spans of solid-core optical fiber.

Unlike a solid-core optical fiber, a hollow-core optical fiber is designed to guide light substantially within a hollow portion thereof, e.g., such that only a minor portion of the guided optical beam propagates in the solid material of the fiber, typically silica or glass. The hollow portion of the hollow-core optical fiber typically contains air. Hence, the term "air-guiding fibers" is sometimes used in the literature to refer to some hollow-core optical fibers. However, in some designs, the hollow portion of the hollow-core optical fiber may contain some other gas, a fluid, or even vacuum. The light-guiding mechanism of a hollow-core optical fiber is very different from that of a conventional solid-core fiber because the cladding of the hollow-core optical fiber has a higher refractive index than the hollow core region thereof.

For example, some hollow-core optical fibers are designed to operate based on the photonic bandgap effect. Such optical fibers may be referred to in the pertinent literature as photonic bandgap fibers. It should be noted however that not all photonic bandgap fibers have a hollow core. Although the light-guiding mechanism of such fibers is rather complex, a simplified explanation can be that the cladding of such fibers can function as a two-dimensional Bragg reflector that can help to effectively confine light to the fiber core. This light-guiding mechanism normally works only within a rather narrow wavelength region due to its resonant nature.

Some other hollow-core optical fibers are designed to operate based on constructive interference of the light reflected from the core-cladding interface and/or from solid anti-resonant elements located within the hollow core. This type of hollow-core optical fibers is referred to as anti-resonant fibers (ARFs). Some examples of ARFs include but are not limited to: (i) a Kagomé fiber with a hypocycloid core contour; (ii) a revolver fiber having a pattern of rings around the hollow center core; (iii) a double revolver fiber having a pattern of nested rings around the hollow center core; (iv) a hollow-core fiber having anisotropic anti-resonant elements; and (v) a hollow-core fiber having a lotus-shaped core (also see FIG. 1). A common feature of these optical fibers is the negative-curvature core shape, i.e., the dielectric walls surrounding the central hollow core have convex curvature if viewed from the core center. No analytical model currently exists to fully explain the light guidance in such fibers. Instead, numerical modeling is used for design purposes and to predict performance. Qualitatively, the guidance and low loss of such optical fibers can be attributed, at least in part, to relatively low optical coupling between the desired propagation mode, primarily confined to the central region of the hollow core, and the leaky cladding modes, primarily confined to the surrounding solid dielectric.

An attractive feature of ARFs is that these optical fibers typically lend themselves to a relatively uncomplicated fabrication process. For example, in some cases, a fiber preform can be made relatively simply by arranging a suitable number of silica capillaries, and then drawing the resulting bundle into a fiber in a conventional manner.

An attractive feature of hollow-core optical fibers as a class is that the backscatter of light caused by Rayleigh scattering can be drastically lower in hollow-core optical fibers than in solid-core optical fibers. Additional benefits stemming from the use of hollow-core fibers may include but are not limited to a reduction of nonlinear optical effects, better dispersion management, and higher signal-propagation speeds.

Figure 1:
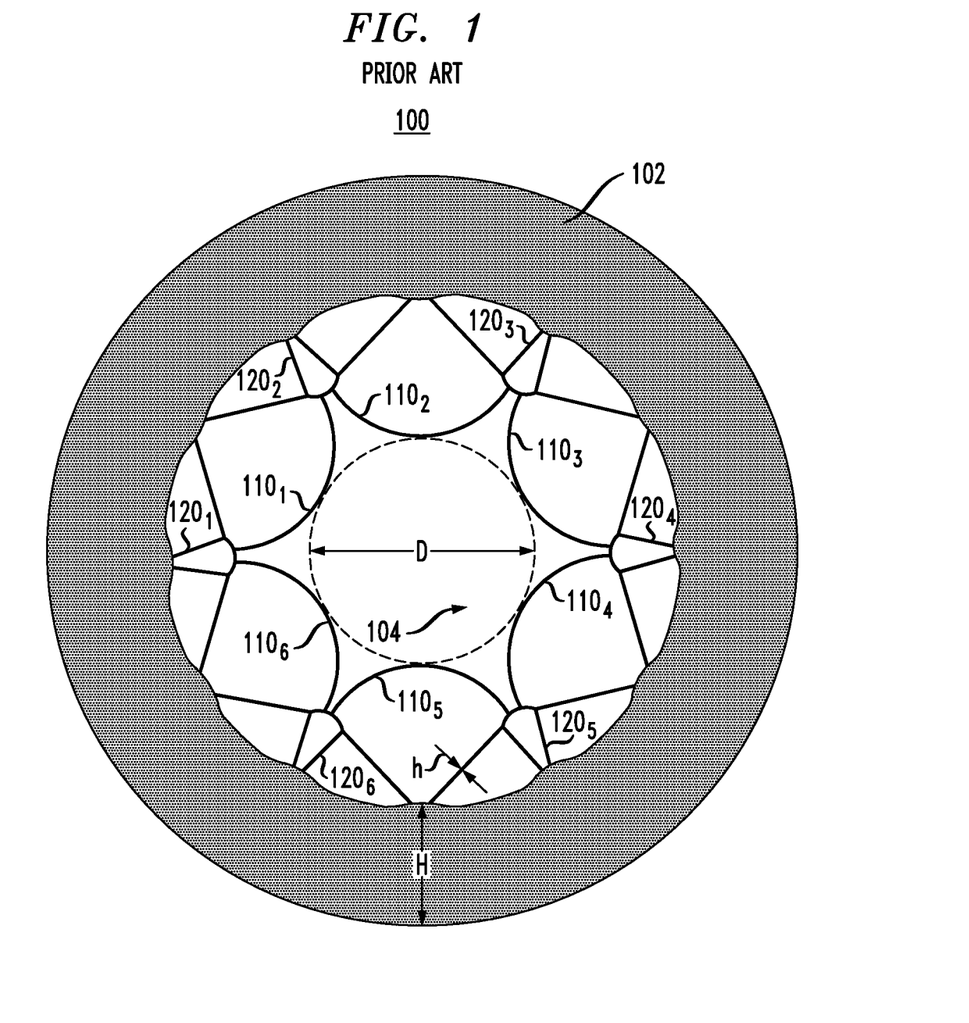
FIG. 1 shows a cross-sectional view of an example hollow-core optical fiber that can be used in some embodiments.

FIG. 1 shows a cross-sectional view of an example hollow-core optical fiber 100 that can be used in some embodiments. Optical fiber 100 comprises a solid tubular cladding 102 and a plurality of interconnected, thin-walled anti-resonant tubular elements $110_1$-$110_6$ and $120_1$-$120_6$. Tubular elements 110/120 are located in the hollow inner part of the tubular cladding 102 and are arranged in an interleaved pattern therein as indicated in FIG. 1. Tubular elements $110_1$-$110_6$ have a larger cross-section than tubular elements $120_1$-$120_6$. Each of tubular elements $110_1$-$110_6$ and $120_1$-$120_6$ is directly attached to the cladding 102 and to two other tubular elements, which results in a structurally robust network of thin solid membranes in the inner part of the tubular cladding 102. Taken together, tubular elements $110_1$-$110_6$ and $120_1$-$120_6$ delimit a hollow tubular core 104 of optical fiber 100. In this example, the cross-sectional shape of core 104 resembles a six-pointed star.

In an example embodiment, the wall thickness H of the tubular cladding 102 can be much larger than the wall thickness h of the individual tubular elements 110 and 120 (i.e., H≫h). The hollow core 104 has a diameter D, defined as the maximum diameter of a circle (shown in FIG. 1 by the dashed line) that can be inscribed within the core boundaries. In an example embodiment, H≈20 µm; h≈0.5 µm; and D≈40 µm. The outer diameter of the tubular cladding 102 can be ca. 125 µm. Example fabrication processes that can be used to manufacture optical fiber 100 are described, e.g., in Mubassira Banu Syed Nawazuddin, Natalie V. Wheeler, John R. Hayes, et al., "Lotus-Shaped Negative Curvature Hollow Core Fiber With 10.5 dB/km at 1550 nm Wavelength," JOURNAL OF LIGHTWAVE TECHNOLOGY, 2018, v. 36, No. 5, pp. 1213-1219, which is incorporated herein by reference in its entirety.

Figure 2:
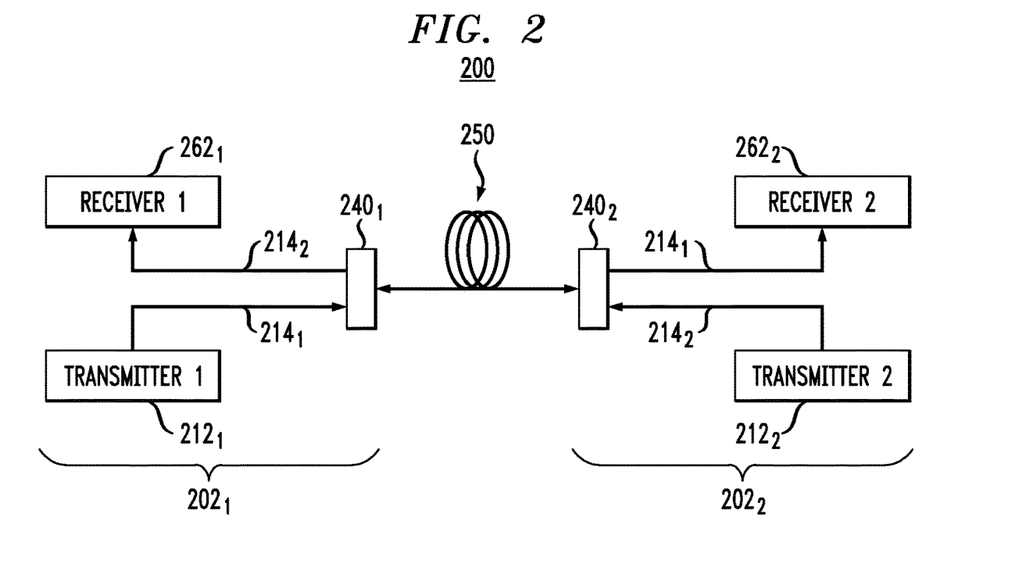
FIG. 2 shows a block diagram of an optical communication system according to an embodiment.

FIG. 2 shows a block diagram of an optical communication system 200 according to an embodiment. System 200 comprises optical data transceivers $202_1$ and $202_2$ connected using a fiber-optic link 250. In an example embodiment, link 250 can be implemented using one or more spans of optical fiber (also see FIG. 4). At least one span of the optical fiber in link 250 comprises a hollow-core optical fiber, such as optical fiber 100 (FIG. 1) or any other suitable hollow-core optical fiber, e.g., selected from the various available options already mentioned above. In addition, link 250 may have one or more optical amplifiers (not explicitly shown in FIG. 2), e.g., each connected between two respective spans of optical fiber in link 250. A typical length of the fiber span between two adjacent optical amplifiers may range from ~50 km to ~150 km. In some embodiments, link 250 may also include additional optical elements (not explicitly shown in FIG. 2), such as optical splitters, combiners, couplers, add-drop multiplexers, switches, etc., as known in the pertinent art.

In some embodiments, link 250 may not have any optical amplifiers therein.

In some embodiments, system 200 may be configured to transport, e.g., optical polarization-division-multiplexed (PDM) signals, wherein each of two orthogonal polarizations of an optical channel can be used to carry a different respective data stream. In other embodiments, system 200 may be configured to transport other types of optical data signals.

Optical data transceiver $202_i$ (where i=1, 2) comprises an optical data transmitter $212_i$ and an optical data receiver $262_i$. Example embodiments of PDM-capable optical data transmitter $212_i$ and optical data receiver $262_i$ are described in reference to FIGS. 6 and 7, respectively. In other embodiments, other suitable types of optical data transmitters and receivers can similarly be used.

In operation, optical data transmitter $212_1$ generates an optical data signal $214_1$, which is then applied to link 250 and is received by optical data receiver $262_2$. Optical data transmitter $212_2$ similarly generates an optical data signal $214_2$, which is applied to link 250 and is received by optical data receiver $262_1$. Example spectral characteristics of optical data signals $214_1$ and $214_2$ are described in more detail below in reference to FIG. 3.

Optical coupling elements $240_1$ and $240_2$ are configured to couple optical data signals $214_1$ and $214_2$ into link 250 such that, in at least some fiber spans of the link, the coupled optical data signals propagate in opposite directions via the same hollow core of at least one hollow-core optical fiber of the link. In at least some cases, the contra-propagating optical data signals $214_1$ and $214_2$ may spatially and temporally overlap (i.e., physically coexist in the same space at the same time) in at least some portions of said same hollow core. In some embodiments, an optical coupling element $240_1$ can be implemented using one or more of the following: (i) an optical-signal separator; (ii) a directional optical coupler; and (iii) an optical circulator.

In some embodiments, link 250 may have one or more segments of hollow-core optical fiber and a span of solid-core optical fiber optically end-connected to one another such that the contra-propagating optical data signals $214_1$ and $214_2$ may also spatially and temporally overlap in at least some portions of the same solid core of the solid-core optical fiber and/or in the segment(s) of hollow-core optical fiber. For example end-segment(s) of such a hybrid optical fiber may have hollow-core(s). Some examples of such embodiments are described in more detail below in reference to FIG. 4.

In some embodiments, link 250 may comprise optical fiber segment(s) with a double-revolver ARF having a pattern of nested rings around the hollow center core, e.g., described in Gregory T. Jasion, Thomas D. Bradley, Kerri-anne Harrington, et al., "Hollow Core NANF with 0.28 dB/km Attenuation in the C and L Bands," presented at OFC 2020, which is incorporated herein by reference in its entirety.

Figure 3:
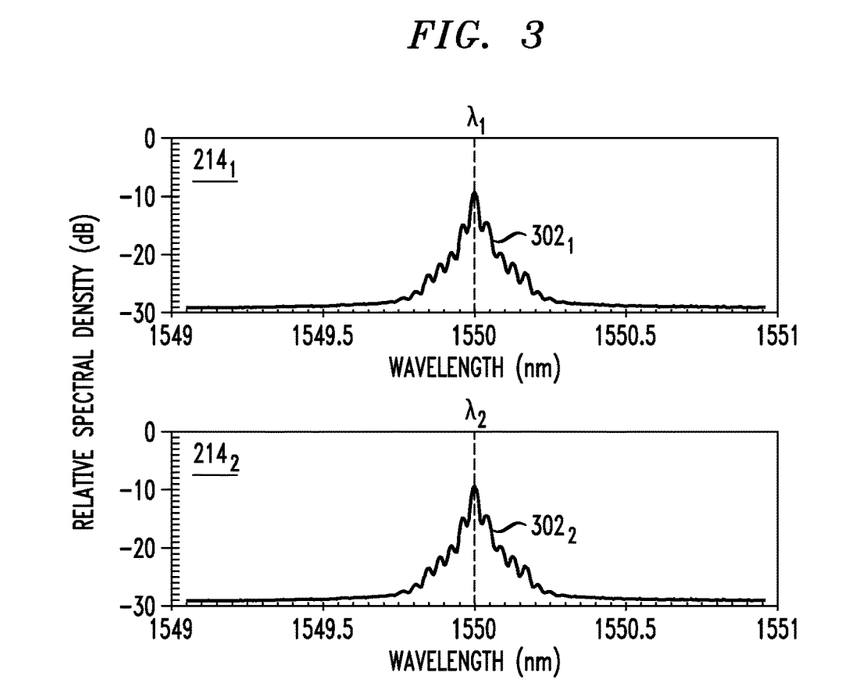
FIG. 3 graphically shows example spectra of contra-propagating optical data signals that can be transmitted in the optical communication system of FIG. 2 according to an embodiment.

FIG. 3 graphically shows example spectra of optical data signals $214_1$ and $214_2$ according to an embodiment. In the shown example, optical data signal $214_1$ has carrier wavelength $\lambda_1$ and a spectrum $302_1$ (see the upper panel of FIG. 3). Spectrum $302_1$ comprises a plurality of modulation sidebands resulting from the carrier wavelength $\lambda_1$ being modulated in transmitter $212_1$ using a data stream and non-return-to-zero (NRZ) ON/OFF keying (OOK) modulation at the rate of 10 Gb/s. Optical data signal $214_2$ has carrier wavelength $\lambda_2$ and a spectrum $302_2$ (see the lower panel of FIG. 3). Spectrum $302_2$ also comprises a plurality of modulation sidebands resulting from the carrier wavelength $\lambda_2$ being modulated using another data stream and NRZ-OOK modulation at the rate of 10 Gb/s.

Although the shown example corresponds to the NRZ-OOK modulation format, other modulation formats may also be used in alternative embodiments. For example, pulse-amplitude modulation (PAM), quadrature phase shift keying (QPSK), and/or quadrature amplitude modulation (QAM) may be used. In some embodiments, optical data signals $214_1$ and $214_2$ may be generated using different respective modulation formats and/or different respective symbol rates.

Although in the example shown in FIG. 3 the carrier wavelengths $\lambda_1$ and $\lambda_2$ are the same (i.e., $\lambda_1=\lambda_2$), various possible embodiments may not be so limited. For example, in some embodiments, carrier wavelengths $\lambda_1$ and $\lambda_2$ may be different, i.e., $|\lambda_1-\lambda_2|=\Delta\lambda\neq 0$. In some embodiments, the carrier wavelength difference $\Delta\lambda$ may satisfy the following inequality:

$$\Delta\lambda < \alpha B \lambda_1^2/c \qquad (1)$$

where $\alpha$ is a selected positive real value smaller than ten (i.e., $0<\alpha\leq 10$); B is the symbol (baud) rate; and c is the speed of light in vacuum. Eq. (1) can alternatively be rewritten as:

$$\Delta f = |f_1-f_2| < \alpha B \qquad (2)$$

where $f_1$ and $f_2$ are the carrier frequencies corresponding to the carrier wavelengths $\lambda_1$ and $\lambda_2$, respectively. In some example embodiments, the following values of $\alpha$ may be used: $\alpha=0.5$; $\alpha=1$; $\alpha=2$; $\alpha=3$.

For some modulation formats, Eq. (1) may be used with an understanding that wavelengths $\lambda_1$ and $\lambda_2$ are center wavelengths of the corresponding spectral envelopes. For such modulation formats, the frequencies $f_1$ and $f_2$ used in Eq. (2) are approximately the center frequencies of those spectral envelopes.

In some embodiments, the carrier-wavelength difference $\Delta\lambda$ may be smaller than 0.1 nm, 0.2 nm, 0.4 nm, 0.8 nm, 2 nm, or 4 nm. The latter condition may equivalently be expressed in terms of the carrier-frequency difference, $\Delta f$. For example, near the carrier wavelength of 1550 nm, the above-listed values of $\Delta\lambda$ correspond to the $\Delta f$ values of 12.5 GHz, 25 GHz, 50 GHz, 100 GHz, 250 GHz, and 500 GHz, respectively.

In at least some embodiments, optical data signals $214_1$ and $214_2$ can be spectrally located in the same optical channel and be used for bidirectional transmission to achieve FDX operation. In such embodiments, the spectral efficiency of system 200 can advantageously be about two times higher than the spectral efficiency of a comparable conventional optical communication system employing only solid-core optical fibers. Herein, the term "optical channel" refers to a spectral band allotted in system 200 to optical data signals $214_1$ and $214_2$. The system's optical-signal routing hardware typically implements optical channels using optical filters (see, e.g., 540, FIG. 5) having the corresponding optical pass bands. Optical signals belonging to the same optical channel may be routed by such optical filters along substantially the same optical path through the filter. In contrast, optical signals belonging to different optical channels may be routed by such optical filters along different respective optical paths through the filter. Some optical paths through such filters may be bidirectional, e.g., meaning that the contra-propagating optical signals of the same optical channel traverse the corresponding same optical path through the filter in opposite directions.

In some embodiments, two or more optical channels of a wavelength-division-multiplexing (WDM) optical communication system may be used for bidirectional transmission to achieve FDX operation for each of such optical channels individually.

Figure 4:
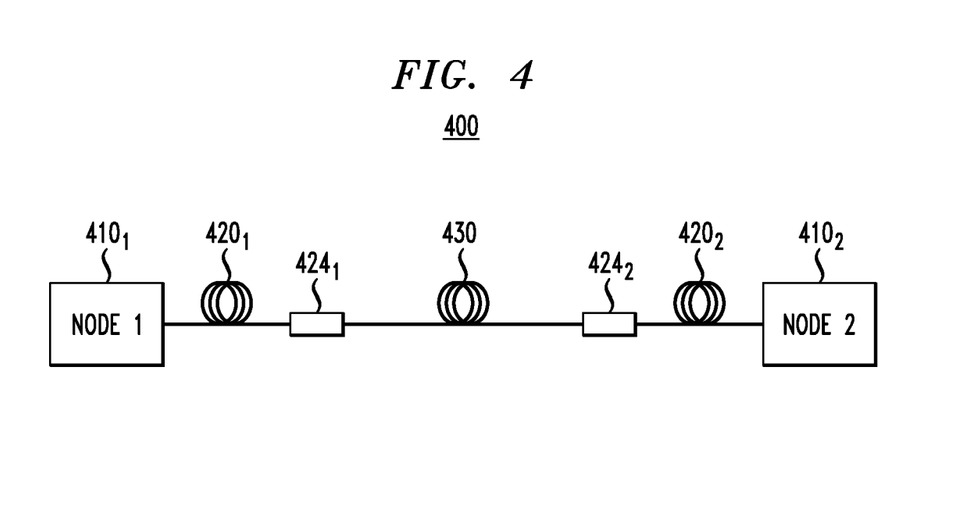
FIG. 4 shows a block diagram of a fiber-link section that can be used in the optical communication system of FIG. 2 according to an embodiment.

FIG. 4 shows a block diagram of a link section 400 that can be used in communication link 250 (FIG. 2) according to an embodiment. In some embodiments, link 250 may have two or more instances of section 400 serially end-connected with one another. As shown in FIG. 4, section 400 comprises link nodes $410_1$ and $410_2$, spans $420_1$ and $420_2$ of hollow-core optical fiber, and a span 430 of solid-core optical fiber. Section 400 further comprises fiber-span connectors $424_1$ and $424_2$, each optically end-connecting the corresponding one of the spans $420_1$ and $420_2$ of hollow-core optical fiber and the span 430 of solid-core optical fiber.

In one example embodiment, each of link nodes $410_1$ and $410_2$ may comprise a bidirectional optical amplifier. In another example embodiment, link nodes $410_1$ and $410_2$ may be optical coupling elements $240_1$ and $240_2$, respectively (also see FIG. 2). In yet another example embodiment, each of link nodes $410_1$ and $410_2$ may comprise a respective WDM optical coupler (e.g., see $540_1$ or $540_2$, FIG. 5). In various other embodiments, each of link nodes $410_1$ and $410_2$ may be implemented using a suitable combination of one or more optical amplifiers, add/drop multiplexers, power equalizers, dispersion compensators, filters, WDM optical couplers, and/or other conventional optical-network components.

In at least some embodiments, it may be more beneficial to use a hollow-core optical fiber only in some portions of link 250, e.g., in the link portions in which the optical power of at least one of the optical data signals $214_1$ and $214_2$ is relatively high. Such link portions are typically located near optical data transmitters $212_1$ and $212_2$ and near optical amplifiers, which may be located in link nodes $410_1$ and $410_2$ in at least some embodiments. If these link portions are implemented using a solid-core optical fiber, then they can act as major contributors to the detrimental Rayleigh backscatter as explained above. In contrast, the hollow-core optical fiber is capable of significantly reducing such detrimental Rayleigh backscatter. However, for some types of hollow-core optical fiber, the relative benefits of the use of hollow-core optical fiber instead of solid-core optical fiber may become somewhat diminished at fiber lengths larger than approximately 20 km, at which point the optical power of the optical data signals $214_1$ and $214_2$ can be significantly reduced by optical losses. Thus, at approximately this fiber-span length, the hollow-core optical fiber can be terminated, and the typically less-expensive conventional solid-core fiber can be used thereafter without incurring a significant additional performance penalty. This feature can be implemented, e.g., by placing fiber-span connectors $424_1$ and $424_2$ at appropriately selected distances from link nodes $410_1$ and $410_2$, respectively, and connecting therebetween the optical-fiber spans $420_1$, 430, and $420_2$ as indicated in FIG. 4.

In at least some embodiments, the optical path between optical data transmitter $212_i$ and optical coupling element $240_i$ and/or the optical path between optical coupling element $240_i$ and optical data receiver $262_i$ (where i=1 or 2) may have significant optical losses therein (also see FIG. 2). In such embodiments, the power of Rayleigh backscattered light entering optical data receiver $262_i$ from a portion of link 250 can be reduced by the net optical losses in those optical paths. Nevertheless, in some of such embodiments, it may also be more beneficial to use a hollow-core optical fiber only in some portions of link 250, e.g., in the link portions in which the net loss from optical data transmitter $212_i$ and/or the net loss to optical data receiver $262_i$ are relatively low.

In some embodiments, a usable configuration of hollow-core and solid-core optical fiber segments may be selected by taking into account both Rayleigh scattering and nonlinear optical effects in the optical fiber, given the specific settings of optical data transmitter $212_i$ and/or optical data receiver $262_i$. Additional parameters that may need to be taken into consideration may include the modulation format, optical loss per unit length of hollow-core optical fiber (e.g., in dB/km), and acceptable SNR margins with respect to the noise components corresponding to Rayleigh backscattered light and/or detrimental nonlinear optical effects. For example, for some hollow-core optical fibers, the optical loss may be around 0.2 dB/km, while for some other hollow-core optical fibers, the optical loss may be around 1 dB/km.

In some example embodiments, each of the optical-fiber spans $420_1$ and $420_2$ may have a length between about 1 km and about 30 km. The total length of hollow-core optical fiber and solid-core optical fiber connected between the link nodes $410_1$ and $410_2$ can be, e.g., between 50 km and 150 km.

Each of fiber-span connectors $424_1$ and $424_2$ is configured to transfer optical data signals $214_1$ and $214_2$ between proximal end faces of the corresponding hollow-core and solid-core optical fibers with relatively low optical losses. In an example embodiment, the span 430 may comprise a conventional single-mode, solid-core optical fiber, e.g., having a core diameter of about 8 μm and a cladding diameter of about 125 μm. Each of the spans $420_1$ and $420_2$ may comprise a suitable hollow-core optical fiber, e.g., having an effective hollow-core diameter of about 40 μm (e.g., see D, FIG. 1) and a cladding diameter of about 125 μm. Since the effective guided-mode diameters of the solid-core and hollow-core optical fibers differ significantly in this illustrative example, low-loss butt-to-butt optical coupling of such fibers may be difficult to achieve. Suitable fiber-span connectors $424_1$ and $424_2$, e.g., each comprising an appropriate passive spot- or mode-size converter, can thus be used in section 400 to optically end-connect hollow-core and solid-core optical fibers with relatively low optical losses.

In one possible embodiment, a fiber-span connector 424 can be implemented using free-space optics, e.g., including one or more lenses. An example spot-size converter that can be used to implement such a fiber-span connector 424 is disclosed, e.g., in U.S. Pat. No. 9,874,699, which is incorporated herein by reference in its entirety.

In another possible embodiment, a fiber-span connector 424 can be implemented using an intermediate optical fiber or waveguide, e.g., including one or more tapered optical cores. The taper of such optical core(s) is typically adiabatic with respect to the light modes being applied thereto by the optical fibers at either end of the fiber-span connector 424, i.e., the taper is sufficiently gradual as to not cause significant leakage and/or back-reflection of the light due to the changing transverse core size and/or cross-sectional shape along the light-propagation path. Several examples of spot-size/mode-size converters that can be adapted for implementing such a fiber-span connector 424 are disclosed, e.g., in U.S. Pat. Nos. 6,834,071, 8,150,224, 8,488,923, 9,964,704, 10,649,148, and 10,663,663, all of which are incorporated herein by reference in their entirety.

Figure 5:
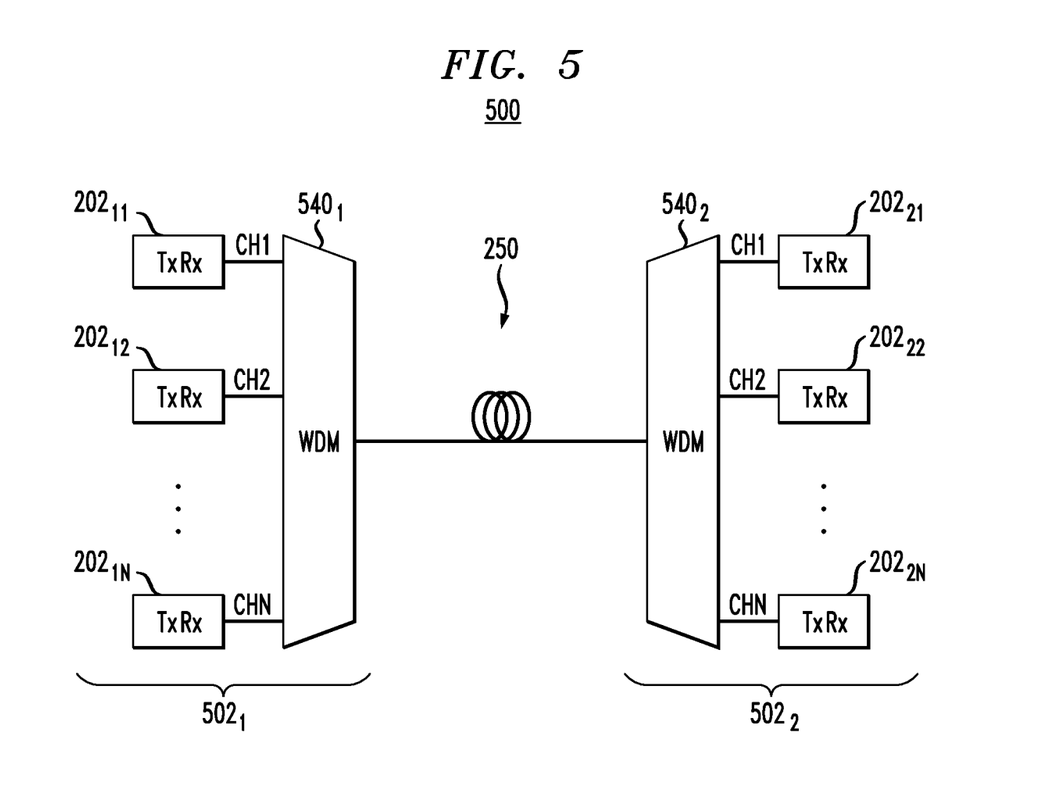
FIG. 5 shows a block diagram of an optical communication system according to another embodiment.

FIG. 5 shows a block diagram of an optical communication system 500 according to another embodiment. System 500 comprises WDM optical data transceivers $502_1$ and $502_2$ connected by way of communication link 250 of FIG. 2 and/or the specific communication link section 400 of FIG. 4.

In an example embodiment, WDM transceiver $502_1$ comprises N individual optical data transceivers $202_{11}$-$202_{1N}$, where the number N is an integer greater than one. The individual optical data transceivers $202_{11}$-$202_{1N}$ may be relatively local or remote. A local or spatially extended WDM optical coupler $540_1$ is connected between optical data transceivers $202_{11}$-$202_{1N}$ and the corresponding proximal end of link 250. WDM transceiver $502_2$ similarly comprises N individual optical data transceivers $202_{21}$-$202_{2N}$. The individual optical data transceivers $202_{21}$-$202_{2N}$ may be relatively local or remote. A local or spatially extended WDM optical coupler $540_2$ is connected between optical data transceivers $202_{21}$-$202_{2N}$ and the corresponding proximal end of link 250.

In operation, WDM optical couplers $540_1$ and $540_2$ enable each pair of transceivers $202_{1b}$ and $202_{2n}$ to establish a bidirectional optical data link and achieve FDX operation over a different respective optical channel CHn, where n=1, . . . , N. For example, each of WDM optical couplers $540_1$ and $540_2$ may operate as a wavelength multiplexer (MUX) for optical data signals propagating therethrough in one direction and as a wavelength demultiplexer (DMUX) for optical data signals propagating therethrough in the opposite direction. In some embodiments, WDM optical couplers $540_1$ and $540_2$ may be nominally identical. In at least some embodiments, the optical data signals bidirectionally transmitted over the same optical channel CHn may have spectral characteristics analogous to those of optical signals $214_1$ and $214_2$, e.g., as described above in reference to FIG. 3.

In some embodiments, the optical channels CH1-CHN may be arranged on a frequency (wavelength) grid, such as a frequency grid that complies with the ITU-T G.694.1 Recommendation, which is incorporated herein by reference in its entirety. The frequency grid used in system 500 can be defined, e.g., in the frequency range from about 186 THz to about 201 THz, with a 100, 50, 25, or 12.5-GHz spacing of the channels therein. While typically defined in frequency units, the parameters of the grid can equivalently be expressed in wavelength units. For example, in the wavelength range from about 1528.8 nm to about 1563.9 nm, the 100-GHz spacing between the centers of neighboring WDM channels is equivalent to approximately 0.8 nm spacing. In alternative embodiments, other suitable frequency grids (e.g., flexible or having other spacing grids) can also be used. As used herein, the term "channel spacing" refers to a frequency (wavelength) difference between the center frequencies (wavelengths) of the optical channels.

Figure 6:
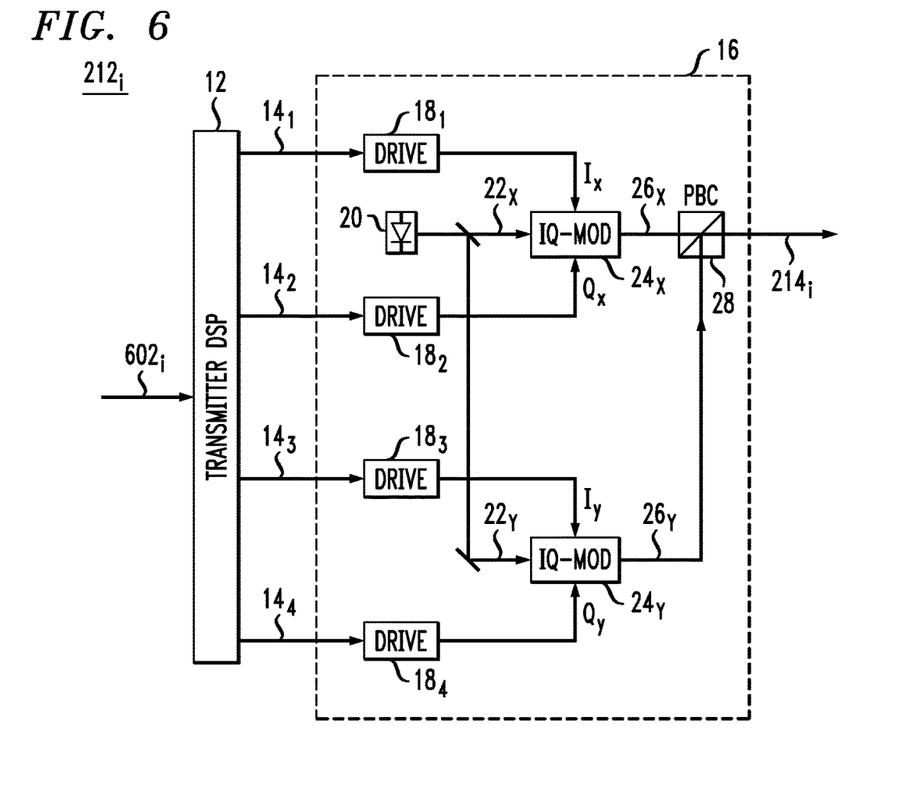
FIG. 6 shows a block diagram of an optical data transmitter that can be used in the optical communication system of FIG. 2 according to an embodiment.

FIG. 6 shows a block diagram of an optical data transmitter $212_i$ that can be used in system 200 (FIG. 2) according to an embodiment, where i=1, 2.

In operation, transmitter $212_i$ receives a digital electrical input stream $602_i$ of payload data and applies said stream to a digital signal processor (DSP) 12. DSP 12 processes input data stream $602_i$ to generate digital signals $14_1$-$14_4$, e.g., approximately in parallel. In an example embodiment, DSP 12 may perform, inter alia, one or more of the following: (i) encode input data stream $602_i$ using a suitable code, e.g., to prevent error propagation and enable error correction at the corresponding receiver; (ii) parse the resulting encoded data stream into a sequence of bit-words; (iii) for each bit-word, determine a corresponding constellation symbol of the operative constellation; (iv) use the determined constellation symbols to generate digital signals $14_1$-$14_4$. For example, in each modulation time slot corresponding to the constellation symbol of the operative constellation, signals $14_1$ and $14_2$ may carry digital values that represent the I component and Q component, respectively, of a corresponding constellation symbol intended for transmission using a first (e.g., X) polarization of light. Signals $14_3$ and $14_4$ may similarly carry digital values that represent the I and Q components, respectively, of the corresponding constellation symbol intended for transmission using a second (e.g., Y) polarization of light.

An E/O converter (or optical front end, OFE) 16 operates to transform digital signals $14_1$-$14_4$ into the corresponding modulated optical output signal $214_i$. More specifically, drive circuits $18_1$ and $18_2$ transform digital signals $14_1$ and $14_2$, as known in the pertinent art, into electrical analog drive signals $I_X$ and $Q_X$, respectively. Drive signals $I_X$ and $Q_X$ are then used, in a conventional manner, to drive an optical I-Q modulator $24_X$. In response to drive signals $I_X$ and $Q_X$, optical I-Q modulator $24_X$ operates to modulate an X-polarized beam $22_X$ of light supplied thereto by a laser source 20 as indicated in FIG. 6, thereby generating a modulated optical signal $26_X$.

Drive circuits $18_3$ and $18_4$ similarly transform digital signals $14_3$ and $14_4$ into electrical analog drive signals $I_Y$ and $Q_Y$, respectively. In response to drive signals $I_Y$ and $Q_Y$, an optical I-Q modulator $24_Y$ operates to modulate a Y-polarized beam $22_Y$ of light supplied by laser source 20 as indicated in FIG. 3, thereby generating a modulated optical signal $26_Y$. A polarization beam combiner (PBC) 28 operates to combine modulated optical signals $26_X$ and $26_Y$, thereby generating the optical output signal $214_i$, said optical output signal being a polarization-division-multiplexed (PDM) signal.

Figure 7:
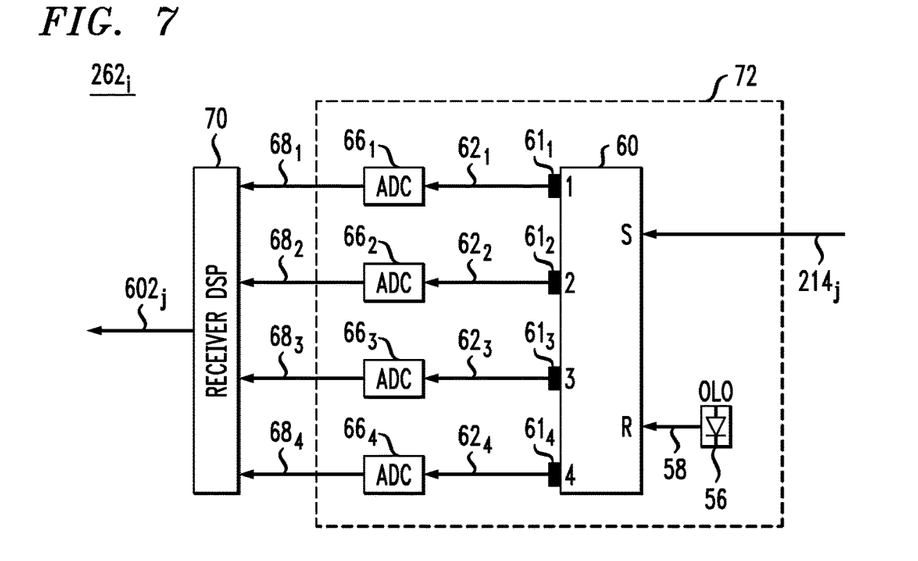
FIG. 7 shows a block diagram of an optical data receiver that can be used in the optical communication system of FIG. 2 according to an embodiment.

FIG. 7 shows a block diagram of an optical data receiver $262_i$ that can be used in system 200 (FIG. 2) according to an embodiment.

An optical front end (or 0/E converter) 72 of receiver $262_i$ comprises an optical hybrid 60, light detectors $61_1$-$61_4$, analog-to-digital converters (ADCs) $66_1$-$66_4$, and an optical local-oscillator (OLO) source 56. Optical hybrid 60 has (i) two input ports labeled S and R and (ii) four output ports labeled 1 through 4. Input port S receives an optical input signal $214_j$, where j=1 if i=2, and j=2 if i=1 (also see FIG. 2). Input port R receives an OLO or reference signal 58 generated by OLO source (e.g., laser) 56. OLO signal 58 has an optical-carrier wavelength (frequency) that is sufficiently close to that of signal $214_j$ to enable coherent (e.g., intradyne) detection of the latter optical signal.

In an example embodiment, optical hybrid 60 operates to mix optical signal $214_j$ and OLO signal 58 to generate different mixed (e.g., by interference) optical signals (not explicitly shown in FIG. 7). Light detectors $61_1$-$61_4$ then convert the mixed optical signals into four electrical signals $62_1$-$62_4$ that are indicative of complex values corresponding to two orthogonal-polarization components of optical signal $214_j$. For example, electrical signals $62_1$ and $62_2$ may be indicative of an analog I signal and an analog Q signal, respectively, or linearly independent mixtures thereof corresponding to a first (e.g., horizontal, h) polarization component of optical signal $214_j$. Electrical signals $62_3$ and $62_4$ may similarly be indicative of an analog I signal and an analog Q signal, respectively, or linearly independent mixtures thereof corresponding to a second (e.g., vertical, v) polarization component of optical signal $214_j$.

Each of electrical signals $62_1$-$62_4$ is converted into digital form in a corresponding one of ADCs $66_1$-$66_4$. Optionally, each of electrical signals $62_1$-$62_4$ may be low-pass filtered and amplified in a corresponding electrical amplifier (not explicitly shown in FIG. 7) prior to the resulting signal being converted into digital form. Digital signals $68_1$-$68_4$ produced by ADCs $66_1$-$66_4$, respectively, are then processed by a DSP 70 to recover the data of the original input data stream $602_j$ applied to transmitter $212_j$.

In an example embodiment, DSP 70 may perform, inter alia, one or more of the following: (i) signal processing directed at dispersion compensation; (ii) signal processing directed at compensation of nonlinear distortions; (iii) electronic compensation for polarization rotation and polarization de-multiplexing; (iv) compensation of frequency offset between OLO 56 of optical receiver $262_i$ and laser source 20 of optical transmitter $212_j$; (v) error correction based on the data encoding (if any) applied at DSP 12; (vi) mapping of a set of complex values conveyed by digital signals $68_1$-$68_4$ onto the operative constellation to determine a corresponding constellation symbol thereof; and (vii) concatenating the binary labels (bit-words) of the constellation symbols determined through said mapping to reconstruct data stream $602_j$.

According to an example embodiment disclosed above, e.g., in the summary section and/or in reference to any one or any combination of some or all of FIGS. 1-7, provided is an apparatus comprising: an optical coupler (e.g., $240_1$, FIG. 2) to end-connect an optical fiber having one or more hollow-core optical fiber segments (e.g., 420, FIG. 4); an optical data transmitter (e.g., $212_1$, FIG. 1) optically connected to the optical coupler to transmit a first optical data signal (e.g., $214_1$, FIG. 1) through the optical fiber; and an optical data receiver (e.g., $262_1$, FIG. 1) optically connected to the optical coupler to receive a second optical data signal (e.g., $214_2$, FIG. 1) through the optical fiber, the first and second optical data signals being in overlapping wavelength channels to propagate in opposite directions along the optical fiber.

In some embodiments of the above apparatus, the first and second optical data signals have a center-frequency difference smaller than a symbol rate of at least one of said signals (e.g., B, Eq. (2)).

In some embodiments of any of the above apparatus, the apparatus is configured for full-duplex operation using a same optical channel.

In some embodiments of any of the above apparatus, the apparatus further comprises an optical transceiver (e.g., $202_2$, FIG. 2) optically end-connected to the optical fiber to receive the first optical data signal therefrom and to transmit the second optical data signal thereto, wherein the optical data transmitter and the optical transceiver are configured to transmit the first and second optical data signals to spatially and temporally overlap in at least a segment of the optical fiber.

In some embodiments of any of the above apparatus, the optical fiber further comprises a solid-core optical fiber segment (e.g., 430, FIG. 4) end-connected to at least one of the one or more hollow-core optical fiber segments.

In some embodiments of any of the above apparatus, the apparatus further comprises an optical mode-size converter (e.g., 424, FIG. 4) optically end-connecting the solid-core and hollow-core optical fiber segments.

In some embodiments of any of the above apparatus, the optical fiber includes a length of hollow-core optical fiber between the optical coupler and said converter, said length being greater than 1 km (or greater than 10 km).

In some embodiments of any of the above apparatus, the optical fiber includes a length of hollow-core optical fiber between the optical coupler and said converter, said length being greater than 100 m but smaller than 40 km.

In some embodiments of any of the above apparatus, the optical fiber comprises a solid-core optical fiber segment (e.g., 430, FIG. 4) end-connected between first and second (e.g., $420_1$ and $420_2$, FIG. 4) hollow-core optical fiber segments.

In some embodiments of any of the above apparatus, the apparatus further comprises a bidirectional optical amplifier (e.g., (e.g., $410_2$, FIG. 4); wherein the first segment is end-connected between the optical coupler and a first end of the solid-core optical fiber segment; and wherein the second segment is end-connected between an opposite second end of the solid-core optical fiber segment and the bidirectional optical amplifier.

In some embodiments of any of the above apparatus, the apparatus further comprises an optical data transceiver (e.g., $202_2$, FIG. 2); wherein the first segment is end-connected between the optical coupler and a first end of the solid-core optical fiber segment; and wherein the second segment is end-connected between an opposite second end of the solid-core optical fiber segment and the optical data transceiver.

In some embodiments of any of the above apparatus, the optical coupler comprises a WDM optical coupler (e.g., $540_1$, FIG. 5).

In some embodiments of any of the above apparatus, the apparatus comprises a WDM optical transceiver (e.g., $502_1$, FIG. 5) connected to the optical coupler to transmit and receive optical data signals through the optical fiber using a plurality of optical channels (e.g., CH1-CHN, FIG. 5).

In some embodiments of any of the above apparatus, the optical coupler comprises an optical circulator.

In some embodiments of any of the above apparatus, the first and second optical data signals have nominally identical carrier wavelengths (e.g., $\lambda_1$, $\lambda_2$, FIG. 3).

In some embodiments of any of the above apparatus, power spectra (e.g., $302_1$, $302_2$, FIG. 3) of the first and second optical data signals at the optical coupler have a spectral overlap representing 30% (or 10%, or 50%) or more of optical power of at least one (e.g., a weaker one) of said signals.

According to another example embodiment disclosed above, e.g., in the summary section and/or in reference to any one or any combination of some or all of FIGS. 1-7, provided is an apparatus comprising: an optical coupler (e.g., $240_1$, FIG. 2) to end-connect a hollow-core optical fiber (e.g., 420, FIG. 4); an optical data transmitter (e.g., $212_1$, FIG. 1) optically connected to the optical coupler to transmit a first optical data signal (e.g., $214_1$, FIG. 1) through a hollow core (e.g., 104, FIG. 1) of the hollow-core optical fiber (e.g., 420, FIG. 4); and an optical data receiver (e.g., $262_1$, FIG. 1) optically connected to the optical coupler to receive a second optical data signal (e.g., $214_2$, FIG. 1) through the hollow core of the hollow-core optical fiber, the first and second optical data signals being in a same optical channel and propagating along the hollow-core optical fiber in opposite directions. In some embodiments of the above apparatus, the first and second optical data signals have a carrier-frequency difference smaller than a symbol rate of at least one of said signals (e.g., B, Eq. (2)).

In some embodiments of any of the above apparatus, the apparatus is configured for full-duplex operation using the same optical channel.

In some embodiments of any of the above apparatus, the first and second optical data signals spatially and temporally overlap in at least some portions of the hollow core. In some embodiments of any of the above apparatus, the apparatus further comprises a solid-core optical fiber (e.g., 430, FIG. 4) end-connected to the hollow-core optical fiber.

In some embodiments of any of the above apparatus, the apparatus further comprises an optical spot-size or mode-size converter (e.g., 424, FIG. 4) configured to transfer the first and second optical data signals between end faces of the hollow-core and solid-core optical fibers connected thereto.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising:
   an optical coupler to end-connect an optical fiber having one or more hollow-core optical fiber segments;
   an optical data transmitter optically connected to the optical coupler to transmit a first optical data signal through the optical fiber; and
   an optical data receiver optically connected to the optical coupler to receive a second optical data signal through the optical fiber, the first and second optical data signals being in overlapping wavelength channels to propagate in opposite directions along the optical fiber.

2. The apparatus of claim 1, wherein the first and second optical data signals have a center-frequency difference smaller than a symbol rate of at least one of said signals.

3. The apparatus of claim 1, wherein the apparatus is configured for full-duplex operation using a same optical channel.

4. The apparatus of claim 1, further comprising an optical transceiver optically end-connected to the optical fiber to receive the first optical data signal therefrom and to transmit the second optical data signal thereto, wherein the optical data transmitter and the optical transceiver are configured to transmit the first and second optical data signals to spatially and temporally overlap in at least a segment of the optical fiber.

5. The apparatus of claim 1, wherein the optical fiber further comprises a solid-core optical fiber segment end-connected to at least one of the one or more hollow-core optical fiber segments.

6. The apparatus of claim 5, further comprising an optical mode-size converter optically end-connecting the solid-core and hollow-core optical fiber segments.

7. The apparatus of claim 6, wherein the optical fiber includes a length of hollow-core optical fiber between the optical coupler and said converter, said length being greater than 1 km.

8. The apparatus of claim 6, wherein the optical fiber includes a length of hollow-core optical fiber between the optical coupler and said converter, said length being greater than 100 m but smaller than 40 km.

9. The apparatus of claim 1, wherein the optical fiber comprises a solid-core optical fiber segment end-connected between first and second hollow-core optical fiber segments.

10. The apparatus of claim 9, further comprising a bidirectional optical amplifier;
    wherein the first hollow-core optical fiber segment is end-connected between the optical coupler and a first end of the solid-core optical fiber segment; and
    wherein the second hollow-core optical fiber segment is end-connected between an opposite second end of the solid-core optical fiber segment and the bidirectional optical amplifier.

11. The apparatus of claim 9, further comprising an optical data transceiver;
    wherein the first hollow-core optical fiber segment is end-connected between the optical coupler and a first end of the solid-core optical fiber segment; and
    wherein the second hollow-core optical fiber segment is end-connected between an opposite second end of the solid-core optical fiber segment and the optical data transceiver.

12. The apparatus of claim 1, wherein the optical coupler comprises a WDM optical coupler.

13. The apparatus of claim 1, comprising a WDM optical transceiver connected to the optical coupler to transmit and receive optical data signals through the optical fiber using a plurality of optical channels.

14. The apparatus of claim 1, wherein the optical coupler comprises an optical circulator.

15. The apparatus of claim 1, wherein the first and second optical data signals have nominally identical carrier wavelengths.

16. The apparatus of claim 1, wherein power spectra of the first and second optical data signals at the optical coupler have a spectral overlap representing 30% or more of optical power of at least one of said signals.

* * * * *